United States Patent [19]

Armbruster

[11] Patent Number: 4,495,316

[45] Date of Patent: Jan. 22, 1985

[54] ACID-CURABLE FLUORIDE-CONTAINING NO-BAKE FOUNDRY RESINS

[75] Inventor: David R. Armbruster, Forest Park, Ill.

[73] Assignee: Acme Resin Corporation, Forest Park, Ill.

[21] Appl. No.: 726,032

[22] Filed: Sep. 23, 1976

[51] Int. Cl.$^3$ ............... C08L 61/10; C08K 3/16
[52] U.S. Cl. ..................... 523/139; 523/144; 523/145; 524/379; 524/389; 524/405; 524/428; 524/541; 524/596; 524/612; 525/501
[58] Field of Search ........... 260/29.3, 29.1 R, 29.2 T, 260/29.2 N, 29.2 R, 30.4 N, 30.4 R, 32.8 N, 32.8 R, 33.4 R, DIG. 40, 29.4R, 37, 38, 39, 59 R, 67 FA, 70 R; 164/43; 523/139, 144, 145; 524/379, 389, 405, 428, 541, 596, 612; 525/561

[56] References Cited

U.S. PATENT DOCUMENTS

| | | | |
|---|---|---|---|
| 3,525,379 | 8/1970 | Johnson | 260/51.5 |
| 3,549,584 | 12/1970 | Sekera | 260/38 |
| 3,639,654 | 2/1972 | Robins | 260/37 R |
| 3,644,274 | 2/1972 | Maurukas | 260/41 A |
| 3,755,229 | 8/1973 | Johnson | 260/29.3 |
| 4,028,271 | 6/1977 | Schaidle et al. | 252/429 R |

*Primary Examiner*—Theodore E. Pertilla

[57] ABSTRACT

A suspension or solution containing an acid-curable fluoride-containing resin which is useful in a foundry process is disclosed. The fluoride-containing resin is curable at room temperatures and above by the addition of a strong acid catalyst. The resin is preferably a phenolic resole resin or a furan-type resin. The fluoride-containing resins, when used in a foundry process are preferably admixed with a foundry sand and a strong acid catalyst. The coated sand is then shaped into the form of a foundry core and is allowed to cure at room temperature or above to a foundry core having excellent tensile strength.

25 Claims, No Drawings

ACID-CURABLE FLUORIDE-CONTAINING NO-BAKE FOUNDRY RESINS

BACKGROUND OF THE INVENTION (a) Field of the Invention

This invention relates to acid-curable resin binder compositions useful in a no-bake foundry process. More particularly, the invention relates to a solution containing a phenolformaldehyde resole acid-curing resin, a furan resin or their combination in the form of a prepolymer which have incorporated therein a fluoride ion.

(b) Description of the Prior Art

Foundry cores and molds used in making metal castings are normally prepared from a composition including sand or other refractory material and a curable or polymerization binder coated on the refractory particles. The purpose of this binder coating is to permit the mixture to be hardened after it is first shaped or molded into a desired form. Shaping of the composition, which usually comprises a major amount of sand and a minor amount of binder, is accomplished through ramming, blowing, or otherwise introducing the mixture into a pattern to thereby assume the shape defined by the adjacent surfaces of the pattern. Then, by using a catalyst or polymerization accelerator introduced before or after the sand mix has been introduced into the pattern, and/or by using heat, the binder is caused to cure, thereby converting the shaped foundry mix into a hard, solid foundry core. This curing is usually accomplished either in the original pattern, in a gassing chamber, or in a holding pattern. Commonly used binders include such materials as phenolic resole resins, urea-formaldehyde resins, furfural alcohol modified urea-formaldehyde resins, furan resins, drying oils and urethane oils.

Generally speaking, two basic techniques exist in the art for effecting a cure once the sand-binder mixture is shaped. The first of these techniques, the elevated temperature method, involves the use of a heat-curable resin system wherein heat is used to effect hardening of the binder. The second technique is known in the art as the "no bake" or "cold-setting" process. As its name implies, the latter process is carried out at room temperature or slightly above; i.e., 5°–50° C. and more often between 15°–35° C.

The first technique, the thermosetting process, allows for high speed automatic core and pattern production (i.e., hardening in 10–45 seconds). However, it has many problems attendant with it. For example, the addition of heat is an added expense to the system as a whole. The high temperatures required, which usually are from about 175° C.–260° C., necessitate the use of special metal patterns adapted to withstand these temperatures and thus are expensive to make and difficult to maintain. Furthermore, automatic core machinery used in the art is difficult to maintain at the elevated temperatures. Should the machinery break down, it is often necessary to let the machinery cool in order to make repairs. Cooling time obviously causes long and expensive delays in production.

The second technique, the "no-bake" or cold-setting process was developed to alleviate the problems attendant with the hot-box process of curing foundry cores. Through the use of the low temperatures of the no-bake or cold-setting process, the problems of the hot-box process are virtually eliminated. However, because of the use of low temperatures, useable strengths are generally achieved only after about 15 minutes and usually closer to 60 minutes cure after the no-bake resin is mixed with sand and a catalyst, compared to 10–45 seconds when using a thermosetting process. In addition, the resins heretofore developed by the art which may be cured at these relatively low temperatures may suffer from lack of tensile strength, short bench life of foundry mixes, etc.

It is quite evident that there has been a need in the foundry core art for a system of making cores which is rapid, which at the same time imparts useable strengths to the cores without the need for high temperatures, and which forms a foundry core with good shake-out and collapsibility characteristics without the foregoing disadvantages.

Progress had been made in overcoming the problems associated with the no-bake resin systems, some of which have been described in the patent literature; e.g., U.S. Pat. Nos. 3,525,379; 3,549,584; and 3,644,274. U.S. Pat. No. 3,644,274 to Maurukas describes a process for the acid-catalyzed polymerization of a fusible furan resin by incorporating a source of fluoride ion in the acid catalyst and the process for forming foundry cores or molds from sand using this new resin system. More particularly, a new acid catalyst system is used whereby a strong acid is admixed with a fluoride ion and this mixture is used to cause polymerization of the resin. Alternatively, the fluoride ion can be mixed with the sand and with the subsequent addition of the acid component, the fluoride ion is available as part of the catalyst system. The fluoride ion/acid catalyst development described in U.S. Pat. No. 3,644,274 has represented an improvement in the no-bake foundry systems, particularly the furan-type resins and conventional phenolic resole resins, both of which have been used on a commercial basis. While the addition of fluoride as part of the catalyst system as described in U.S. Pat. No. 3,644,274 improves the tensile strength of the foundry cores and molds, it has been found that this catalyst system containing fluoride ion often releases a pungent odor due to the presence and/or release of hydrofluoric acid which is undesirable both from an environmental and health of foundry workers standpoint. With increasingly tight air pollution laws and Occupational Safety and Health Act (OSHA) laws there is concern over the use of these fluoride-containing catalysts. Thus, there is a need to find the means to reduce these problems without sacrificing the beneficial properties of the prior art resin systems.

SUMMARY OF THE INVENTION

It has now been discovered that greatly improved no-bake resins can be prepared in accordance with this invention by the addition of fluoride ion to a solution containing an acid-curable resin binder system.

The present invention also provides as another embodiment a solution containing an acid-curable resin binder and a small, but effective, amount of fluoride compound that is capable of generating fluoride ions during acid-curing of the acid-curable resin binder. Specifically, the resin binder system of the present invention comprises an acid-curable resin binder or mixture of resin binders dissolved in a solvent for said resin binder or mixture of resin binders and a small, but effective amount of a fluoride compound that is capable of generating fluoride ions during acid-curing of the acid-curable resin binder or mixture of resin binders, said acid-curable resin binder or mixture of resin binders in the solution having a viscosity ranging from about 10 cps to about 1000 cps, at 25° C. and preferably 40 to about 500 cps for resole resins and about 10 to about 250 cps for furan resins. The resin binders will generally have a molecular weight in the range of from about 100 to about 1000 and preferably a molecular weight in the range of from about 100 to about 500. Higher molecular weight materials may be used if sufficient solvent is present to reduce the viscosity to the above range.

The present invention further provides an improved process for forming foundry cores and molds comprising the steps of: producing an acid-curable resin binder which is acid-curable at ambient temperatures and which includes a small but effective amount of a fluoride compound that is capable of generating fluoride ions during the curing of the prepolymer. An acid-catalyst is admixed with the sand or other refractory material and then a predetermined quantity of the resin binder is introduced to produce the foundry mix. This order of mixing the components of the foundry mix is preferred so as to obtain the greatest uniformity in the mix. The foundry mix is then formed into the desired mold shape and allowed to cure for a suitable period of time to produce the hardened mold.

Foundry cores and molds having increased tensile strength form another embodiment of the present invention.

Alternatively, the resin binder system of this invention allow foundry cores and molds to be produced which have a tensile strength equivalent to those of the prior art, but which utilize a lower binder level in the sand.

DETAILED DESCRIPTION OF THE PREFERRED EMBODIMENTS

This invention is generally applicable to any of a wide range of known no-bake foundry resins such as phenol-formaldehyde resins, urea-formaldehyde resins, melamine formaldehyde resins, furan-urea-formaldehyde resins and combinations of these materials. Phenolic resole resins and furan resins are preferred.

As further examples of resins which are useful in the process of this invention, see, for example, U.S. Pat. No. 3,525,379, which describes certain resorcinol resins, phenolic resorcinol resins and certain ethylene urea-terminated resins characterized by the formula:

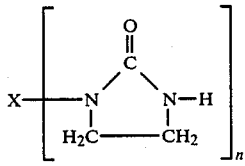

wherein X is an organic structure having a molecular weight between about 100 and 5000 and n is greater than 1.

Also, see U.S. Pat. No. 3,549,584, which describes certain resins utilizing furfural alcohol; and, U.S. Pat. No. 3,644,274, which describes certain preferred furan no-bake foundry resins. The disclosures of the aforementioned three U.S. patents are hereby incorporated by reference and are thereby intended verbatim to be made a part of this specification.

Among the particularly preferred resinous prepolymers useful in this invention are the resole phenolic no-bake resins made by reacting phenol and formaldehyde. The mole ratio of formaldehyde to phenol is at least about and generally greater than 1:1 and is preferably in the range of 1.1:1 to 2.0:1 and most preferably about 1.5:1. Mole ratios greater than 2.0 to 1 can also be used but the odor during core or mold making is higher.

These resole resins generally contain small quantities of water which acts as a solvent thereby controlling viscosity. Generally, water contents of from about 3% to about 30% based on total weight of the resin system are useful. In addition to the water, the resins may also contain small amounts of other hydrophilic solvents; such as, alcohols, ketones, ethers and esters. Examples of useful solvents are methanol, ethanol, acetone, furfuryl alcohol and mixtures thereof. Viscosities should normally be kept between about 10 to 1000 cps and preferably between about 40 and 500 cps for resole resins and about 10 to about 250 cps for furan resins. Resins with viscosities higher than these may be used but are less desirable because they are harder to pump and do not coat the sand as readily. Generally, up to about 35% total solvent and water will yield viscosities in the desired range.

It is generally desirable to add small amounts of other materials to modify the properties of the phenolic resole resins. The addition of small quantities of urea-type compounds such as urea, ethylene urea and propylene urea reduces the odor of the binders during the core or mold production. Generally, the addition of from about 0.5% to about 5% of a urea compound based on resin weight will lower the odor. The addition of silanes such as gamma-aminopropyltriethoxy silane is also useful to improve strength and moisture resistance of the final core.

The phenolic compound used to produce these resole resins is generally phenol itself. However, other phenolic compounds such as ortho-cresol, meta-cresol, para-cresol, bisphenol-A t-butyl phenol, catechol and resorcinol may be used. These are generally used in combination with phenol and other mixtures may also be used.

The aldehyde that is generally used to make these resins is formaldehyde. However, other aldehydes such as acetaldehyde, paraformaldehyde and furfural may also be used.

The other preferred resinous materials useful in the practice of this invention are the furan, e.g., those disclosed in U.S. Pat. No. 3,644,274 and others known in the art. These resins may contain substantial amounts of furfural alcohol as a reactive solvent and may contain from 0% to about 25% water. In addition, the urea levels may be as high as about 35%.

Similarly, the other resinous prepolymers useful in the practice of this invention can be produced by the methods described in the aforementioned patents and by other methods well-known in the art.

It has been found that the addition of small quantities of fluoride compounds or compounds that generate fluoride ion during the foundry core or mold production will significantly improve the tensile strength of the cores and molds. In order to obtain cores having equivalent tensile strengths without utilizing a fluoride containing compound, a higher solids, and thereby higher viscosity, resinous material must be used which is difficult to pump and difficult to coat on the refractory material. It is desirable to use as low a viscosity material as possible in no-bake type applications.

In order to obtain tensile strength improvement of the foundry core or mold, the fluoride compound may be directly added to the sand, may be in the acid catalyst, or may be dissolved or dispersed in the resinous binder. It is feature of this invention that the fluoride compound be incorporated into the resin binder. In this fashion, the odor produced during the core or mold production will generally be lower than when the fluoride is added to the acid catalyst or when it is directly added to the refractory material. In addition, the tensile strengths produced in accordance with this invention are significantly higher than when the fluoride is added to the catalyst or directly to the refractory material itself.

Generally, useful quantities of fluoride compound are in the range of from about 0.02% to about 5%, based on weight of resin system, with the preferred level being from about 0.1 to about 1%.

While any level of fluoride ion will produce some effect, such effect will become insignificant below about 0.02% fluoride.

Generally, any fluoride compound which will yield fluoride ion during the production of foundry cores or molds may be used in the process of this invention. Examples of such useful fluoride compounds include ammonium fluoride, ammonium bifluoride, ammonium fluoborate, hydrofluoric acid, fluoboric acid, sodium fluoride, calcium fluoride, potassium fluoride, potassium fluoroborate, fluosilisic acid, sodium fluosilicate, borontrifluoride complexes, amine salts of hydrofluoric acid and amine salts of fluoboric acid. The preferred fluoride compounds are ammonium fluoride, ammonium bifluoride and ammonium fluoborate. Mixtures of fluoride compounds may also be used.

The resinous prepolymers used in this invention are cured through the addition of strong acid catalysts. Among the useful acids are, for example, hydrochloric acid, sulfuric acid, phosphoric acid, p-toluene sulfonic acid, phenol sulfonic acid, benzene sulfonic acid, strong Lewis acids and mixtures thereof. Preferred acids are p-toluene sulfonic acid, phenol sulfonic acid and benzene sulfonic acid for resoles and also phosphoric acid for furans, either alone or mixed with a mineral acid. These acids are normally diluted with small quantities of water to enable them to be coated on the refractory material. In some cases, lower alkyl alcohols such as methanol or ethanol may be added to improve storage stability of these catalysts.

The refractory particulate materials which are useful in forming these foundry cores are well-known in the art. These include all types of silica sands, such as washed and dried silica, fused silica, lake sands and bank sands.

Foundry cores and molds are generally prepared by first mixing the acid catalyst with the sand and then introducing as a second step the resinous prepolymer to the sand and acid catalyst mixture. The resulting mixture is then thoroughly mixed to coat the sand with the resinous prepolymer and the catalyst material. The resulting coated sand is then placed in a pattern to cure under ambient conditions. When the core or mold is cured it is then removed from the pattern and will, of course, retain the shape of this pattern. Conventional foundry sand mullers can be used to mix the sand, acid catalyst and resinous prepolymer together. Also, any of the continuous sand mixers commonly used in the foundry indusry for no-bake binder systems may also be used.

Generally, from about 0.7% to about 4% resinous material is used based on the weight of the sand, and from about 15% to about 100% acid catalyst is used based on the resin weight. Preferably, from about 0.9% to about 2% resin is used and from about 20% to about 60% acid catalyst. The utilization of the resinous material of this invention generally will allow lesser quantities of this binder material to be used with the sand as a higher tensile strength is developed per given amount of binder. This higher tensile can then be used either to produce stronger cores or molds which are less likely to break upon handling or metal pouring and thus reducing the scrap rate, or to produce cores having a given tensile strength using less binder which is, of course, economically advantageous.

The following examples demonstrate this invention and are not meant as limitations thereon. All parts and percentages are by weight unless otherwise specified.

EXAMPLE I

To a reaction flask were added 2000 g. of phenol, 2070 g. of 37% formaldehyde and 30 g. of calcium hydroxide. The mixture was heated to 70° C. and maintained at that temperature for two hours. The resin was then cooled and 51 g. of 35% hydrochloric acid added. The resin was then vacuum dehydrated to a refractive index of 1.5607 at 25° C. Then 240 g. of methanol, 125 g. of water, 6.5 g. of gamma-aminopropyltriethoxy silane and 12 g. of 35% hydrochloric acid were added. The resulting resin had a viscosity of 47 cps at 25° C. and a pH of 6.5. This phenolic resole resin is labeled "Resin A".

A portion of this resin was modified by admixing with ¼% of potassium fluoborate and labeled "Resin B".

An acid catalyst was prepared by mixing 70 g. of benzene sulfonic acid, 18 g. of methanol and 12. g. of water. This catalyst was used to cure both Resins A and B in the sand tests outlined below.

Tensile test cores were prepared by placing 5000 g. of Wedron 7020 silica sand into the mixing bowl of a Hobart A-120 mixer. Thirty grams of acid catalyst were added to the sand and mixed 60 seconds. Then 75 g. of either Resin A or Resin B was added to the sand and mixed an additional 60 seconds to give a uniform sand-resin-catalyst mixture. Standard American Foundry Society 1-inch tensile briquets were then prepared by hand ramming the sand into the tensile core boxes. The tensile cores were allowed to cure for 30 minutes and then removed from the core box. Tensile strengths were then measured after 2 hours and 24 hours using a Detroit Testing Machine Company Model CST testing machine. The tensile data listed below clearly shows that Resin B containing fluoride gives much higher tensile strength than the control Resin A.

|  | Tensile Strength | |
| --- | --- | --- |
|  | 2 Hours | 24 Hours |
| Resin A | 253 psi | 320 psi |
| Resin B | 370 psi | 465 psi |

EXAMPLE II

To a reaction flask were added 2000 g. of phenol, 2100 g. of 37% formaldehyde and 40 g. of calcium hydroxide. The mixture was heated to 70° C. and held at 70° for two hours. The resin was cooled and neutralized with 35% hydrochloric acid. The resin was vacuum dehydrated to a refractive index of 1.561 at 25° C. Then 240 g. of methanol, 125 g. of water and 6.6 g. of gamma-aminopropyltriethoxy silane were added. The resin had a viscosity of 43 cps at 25° C. and a pH of 6.6. This resin was labeled "Resin A."

A portion of this resin was modified by adding 0.2% ammonium bifluoride and labeled "Resin B."

Another portion of this resin was modified by adding 0.26% of 49% hydrofluoric acid and labeled "Resin C."

Acid catalysts were prepared as follows. An acid catalyst was prepared by mixing 70 g. of benzene sulfonic acid, 11 g. of methanol, 5 g. of sulfuric acid and 14 g. of water. This catalyst was labeled "Catalyst 1." An acid catalyst containing fluoride, "Catalyst 2," was prepared by mixing 70 g. of benzene sulfonic acid, 11 g. of methanol, 5 g. of sulfuric acid, 14 g. of water and 0.75 g. of 49% hydrofluoric acid.

Tensile test cores were produced and tensile strengths determined as described in Example I. Results are summarized below.

| Experiment | I | II | III | IV |
|---|---|---|---|---|
| Resin | A | A | B | C |
| Catalyst | 1 | 2 | 1 | 1 |
| 2 Hr. Tensile, psi | 111 | 206 | 431 | 389 |
| 24 Hr. Tensile, psi | 139 | 242 | 561 | 419 |
| Odor | Low | High* | Low | Low |

*When catalyst 2 mixed with sand a sharp acid odor was noted. This odor is not present when the fluoride is a component of the resin.

Comparison of tensile results of Experiments I and II clearly shows that addition of fluoride as a catalyst component results in a tensile improvement.

Comparison of tensile results of Experiments III and IV to the control Experiment I shows that addition of fluoride to the resin greatly improves tensiles while keeping the odor low.

Comparison of Experiments III and IV with Experiment II clearly shows that the greatest tensile improvement is obtained by having the fluoride in the resin.

EXAMPLE III

A commercially available furan resin Acme 926 resin* having a viscosity of 90 cps and a water content of 5.5% was modified by adding 0.2% ammonium fluoborate. Tensile strengths were compared to unmodified Acme 926 resin using the same test procedures as outlined in the previous examples. In these tensile tests, 1.5% resin based on resin weight and 33% of 75% phosphoric acid catalyst were used.

* manufactured and sold by Acme Resin Company, Forest Park, Ill.

| Tensile Strength | 24 Hour |
|---|---|
| Control Resin | 395 psi |
| Resin plus 0.2% NH4BF4 | 540 psi |

While the invention has been described in connection with specific embodiments thereof, it will be understood that it is capable of further modifications, and this appplication is intended to cover any variations, uses, or adaptions of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. An acid-curable resin binder solution consisting essentially of:
   (a) a resinous material selected from the group consisting of phenolic resole resins, furan resins, resorcinol resins, phenolic resorcinol resins, ethylene urea-terminated resins characterized by the formula:

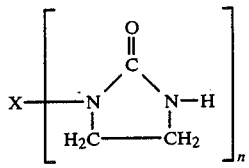

wherein X is an organic structure having a molecular weight of from about 100 to about 5000 and n is greater than one and mixtures thereof;
   (b) a compound that generates fluoride during acid-curing of the prepolymer; and
   (c) a hydrophilic solvent for said resinous material, said solvent being present in an amount sufficient to provide a viscosity in the range of from about 10 to about 1000 cps at 25° C.

2. An acid-curable resin binder in accordance with claim 1, wherein said resinous material has a molecular weight in the range of from about 100 to about 1000.

3. An acid-curable resin binder in accordance with claim 2, wherein said resinous material has a molecular weight in the range of from about 100 to about 500.

4. An acid-curable resin binder in accordance with claim 1, wherein said resinous material is a furan resin.

5. An acid-curable resin binder in accordance with claim 1, wherein said resinous material is a phenolic resole resin.

6. An acid-curable resin binder in accordance with claim 5, wherein said phenolic resole resin is the reaction product of an aldehyde selected from the group consisting of formaldehyde, paraformaldehyde, acetaldehyde, and furfural and a phenolic compound selected from the group consisting of phenol, ortho-cresol, meta-cresol, para-cresol, bisphenol-A, tert-butyl phenol, catechol, resorcinol and mixtures thereof.

7. An acid-curable resin binder in accordance with claim 6, wherein the mole ratio of aldehyde to phenolic compound is in the range of about 1:1 to about 2:1.

8. An acid-curable resin binder solution in accordance with claim 1, wherein the quantity of fluoride-containing compound utilized is from about 0.02% to about 5%, based on weight of resin binder.

9. An acid-curable resin binder solution in accordance with claim 1, wherein said fluoride-containing compound is selected from the group consisting of ammonium fluoride, ammonium bifluoride, ammonium fluoborate, and mixtures thereof.

10. An acid-curable resin binder solution in accordance with claim 1, wherein the solvent is present in an amount sufficient to provide a viscosity in the range of from about 10 to about 500 cps at 25° C.

11. An acid-curable resin binder solution in accordance with claim 1, wherein said hydrophilic solvent is selected from the group consisting of water, lower aliphatic alcohols, lower aliphatic ketones, furfuryl alcohol and mixtures thereof.

12. A method for making shaped articles such as foundry cores comprising the steps of:
(a) forming a mixture of a particulate refractory material and an acid catalyst;
(b) adding to said mixture an acid-curable resin binder solution consisting essentially of a resin binder selected from the group consisting of phenolic resole resins, furan resins, resorcinol resins, phenolic resorcinol resins, ethylene urea-terminated resins characterized by the formula:

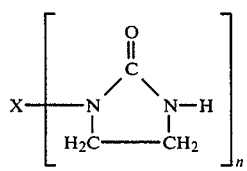

wherein X is an organic structure having a molecular weight of from about 100 to about 5000 an n is greater than one, and mixtures thereof; a compound that generates fluoride ion during acid curing of the binder; and a hydrophilic solvent for said resin binder; said solvent being present in an amount sufficient to provide a viscosity in the range of from about 10 to about 1000 cps at 25° C.;
(c) forming the mixture into the desired shape; and allowing said shaped mixture to cure at ambient conditions to produce said shaped article.

13. A method in accordance with claim 12, wherein said resin binder is a furan resin.

14. A method in accordance with claim 12, wherein said resin binder is a phenolic resole resin.

15. A method in accordance with claim 14, wherein said phenolic resole resin binder is the reaction product of an aldehyde selected from the group consisting of formaldehyde, paraformaldehyde, acetaldehyde and furfural and the phenolic compound selected from the group of phenol, ortho-cresol, meta-cresol, bis-phenol-A, tert-butyl-phenol, catechol, resorcinol and mixtures thereof.

16. A method in accordance with claim 15, wherein the mole ratio of aldehyde to phenolic compound is in the range of about 1:1 to about 2:1.

17. A method in accordance with claim 12, wherein said resin binder has a molecular weight in the range of from about 100 to about 1000.

18. A method in accordance with claim 12, wherein said resin binder has a molecular weight in the range of from about 100 to about 500.

19. A method in accordance with claim 12, wherein the quantity of fluoride-containing compound utilized is from about 0.02% to about 5%, based on weight of resin binder.

20. A method in accordance with claim 12, wherein said fluoride-containing compound is selected from the group consisting of ammonium fluoride, ammonium bifluoride, ammonium fluoborate, and mixtures thereof.

21. A method in accordance with claim 12, wherein the solvent is present in an amount sufficient to provide a viscosity in the range of from about 10 to about 500 cps at 25° C.

22. A method in accordance with claim 12, wherein said hydrophilic solvent is selected from the group consisting of water, lower aliphatic alcohols, lower aliphatic ketones, furfuryl alcohol and mixtures thereof.

23. A method in accordance with claim 12, wherein said acid catalyst is selected from the group consisting of p-toluene sulfonic acid, phenol sulfonic acid, benzene sulfonic acid, phosphoric acid and mixtures thereof.

24. The product of claim 13.

25. The product of claim 14.

* * * * *